United States Patent [19]
Kojima et al.

[11] 3,890,616
[45] June 17, 1975

[54] RADAR ANTI-COLLISION SYSTEM FOR SHIPS IN WATERS ADJACENT LAND AREAS

[75] Inventors: Takeshima Kojima; Masabumi Iizuka, both of Tokyo; Kenta Kabayama; Shizuhiro Izawa, both of Yokohama, all of Japan

[73] Assignee: Mitsubishi Jukogyo Kabushiki Kaisha, Japan

[22] Filed: Sept. 6, 1973

[21] Appl. No.: 394,575

[30] Foreign Application Priority Data
Dec. 28, 1972  Japan..................................... 48-327

[52] U.S. Cl......... 343/5 MM; 343/5 EM; 343/5 ST; 343/112 CA
[51] Int. Cl............................ G01s 7/22; G01s 7/24
[58] Field of Search . 343/5 MM, 5 ST, 5 EM, 5 LS, 343/6 TV, 112 CA, 5 DP

[56] References Cited
UNITED STATES PATENTS

| | | | |
|---|---|---|---|
| 2,952,075 | 9/1960 | Davis.............................. | 343/5 MM |
| 3,298,022 | 1/1967 | Smith........................... | 343/112 CA |
| 3,299,425 | 1/1967 | Smith et al...................... | 343/5 MM |
| 3,328,795 | 6/1967 | Hallmark ....................... | 343/5 MM |
| 3,614,035 | 10/1971 | Buynak et al................... | 343/5 MM |

*Primary Examiner*—Maynard R. Wilbur
*Assistant Examiner*—G. E. Montone
*Attorney, Agent, or Firm*—McGlew and Tuttle

[57] ABSTRACT

The radar signals of a vessel navigating on a given course are supplied to a data processing unit connected to an input of a computer. An auxiliary memory is connected to an input of the computer and has stored therein data with respect to land areas adjacent the course of the vessel, and these data are supplied to the computer progressively in accordance with a preset program for comparison with the data supplied by the processing unit. If the comparison indicates that the vessel is at a greater distance from land areas than limits defined by the stored positional data, the processed positional data corresponding to scanned land areas is deleted from the data supplied to a collision avoidance program, so that the processing by this collision avoidance program is made more reliable. After processing by these programs, data are displayed on a display unit.

4 Claims, 2 Drawing Figures

Auxiliary Memory With Land Area Data

RADAR ANTI-COLLISION SYSTEM FOR SHIPS IN WATERS ADJACENT LAND AREAS

FIELD AND BACKGROUND OF THE INVENTION

This invention relates to anti-collision systems and, more particularly, to such an anti-collision system using a radar mounted on a vessel navigating on a given course.

In prior art anti-collision systems utilizing a radar mounted on a vessel, there had been difficulties in discriminating between radar signals corresponding to land areas and radar signals corresponding to other vessels in the neighborhood. For anti-collision purposes, the processing of radar signals relating to land areas is not only not necessary but also may even be harmful.

SUMMARY OF THE INVENTION

The general objective of the present invention is to provide a radar anti-collision system in which data, with respect to land areas along the course of a vessel, are stored beforehand in a memory, by a computer program. These data are compared with the data provided by a radar mounted on the vessel, and which latter data may include land area signals or data as well as data with respect to the position of vessels in the neighborhood of the vessel carrying the anti-collision system. If the comparison indicates that the vessel is at a greater distance from land areas than limits defined by the land area data stored in the memory, the land area data of the signals from the radar on the vessel is eliminated and a collision avoidance program is provided with positional data corresponding to only the positions of other vessels in the neighborhood of the vessel carrying the anti-collision system. The land areas or regions as stored in the memory are not necessarily defined as accurate coastlines but only by linear segments approximating the coastlines.

An object of the invention is to provide an improved anti-collision system.

Another object of the invention is to provide such an improved anit-collision system using a radar mounted on a vessel and scanning both land areas adjacent the course of the vessel and other vessels in the neighborhood.

A further object of the invention is to provide an improved anti-collision system having a display unit which, responsive to the vessel being at a distance greater than a selected distance from land areas, displays only data with respect to other vessels in the neighborhood of the vessel carrying the anti-collision system.

For an understanding of the principles of the invention, reference is made to the following description of a typical embodiment thereof as illustrated in the accompanying drawing.

DESCRIPTION OF THE PREFERRED EMBODIMENT

Figure 1:
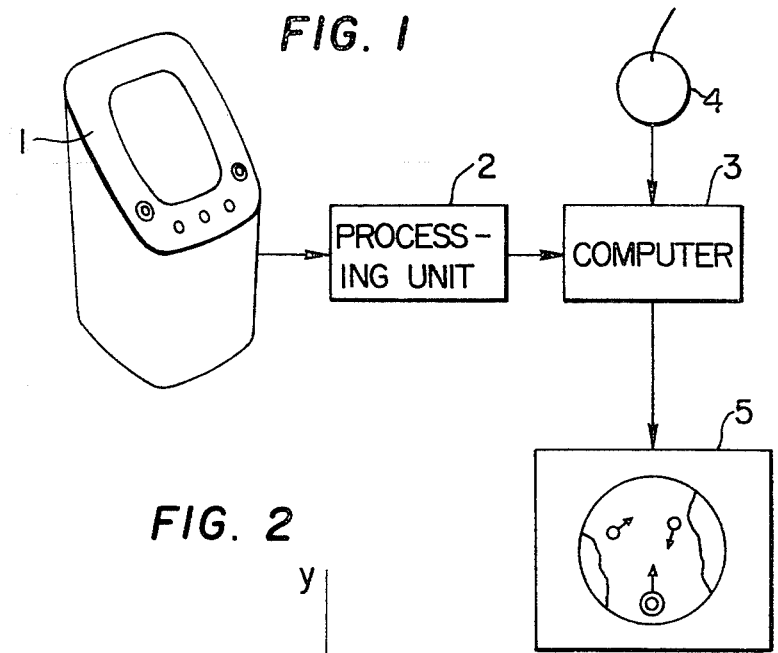
FIG. 1 is a schematic diagram illustrating a radar anticollision system embodying the invention.

Referring to FIG. 1, a data processing unit 2 is connected to the output of a radar 1 for the purpose of suppressing noise, and the output of processing unit 2 is supplied to a computer 3. An auxiliary memory 4 is connected to computer 3 and has stored therein positional data with respect to land areas along the course of the vessel. A general display unit (CRT), indicated at 5, is connected to the output of computer 3.

The video signal from radar 1 is written into the noise suppressing signal processing unit 2, such as, for example, a storage tube. In this operation, two or three frames are written in superposition in the unit 2 by $R$-$\theta x$ scanning in synchronism with the radar signal. Each frame of the storage tube can contain data corresponding to one frame of radar 1. Each frame is divided into quantum areas in approximately one one-thousandth mesh in the X and Y directions, and the quantized data are read out by a television scanning system. In each quantum area, where the signal is above a certain threshold value, its state is 1 and, where the signal is below the same threshold value, its state is 0. The coordinates $(x_1, y_1), (x_2, y_2), ..., (x_n, y_n)$ in the quantum areas where the state of the signal is 1 in each frame are supplied to computer 3.

Figure 2:
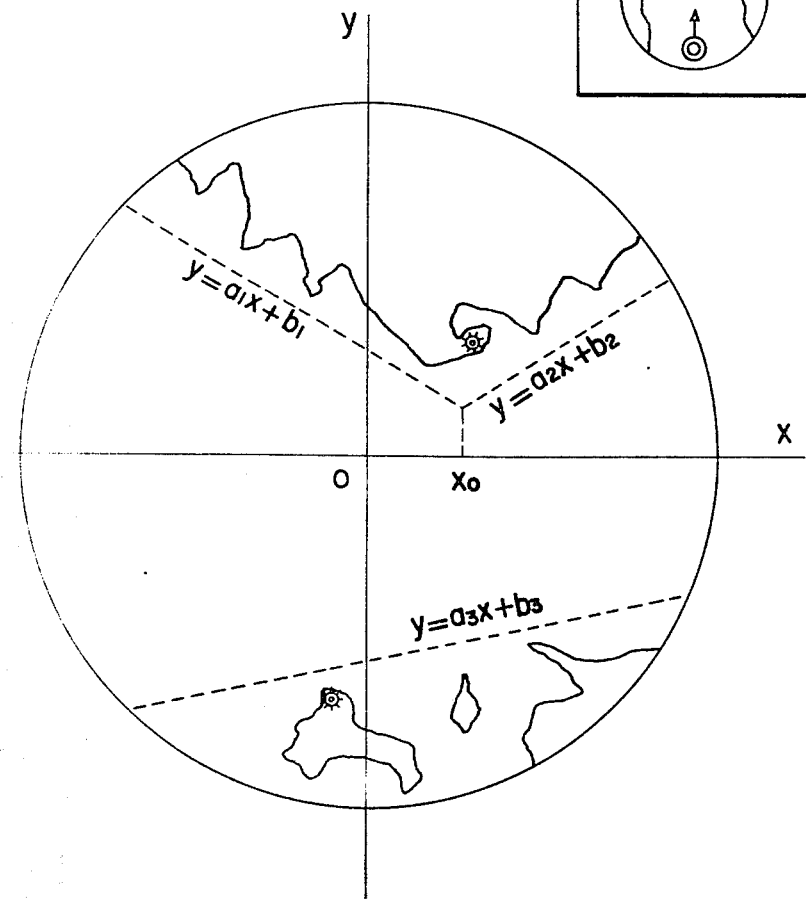
FIG. 2 is a graphic representation illustrating the land area data to be stored beforehand in the system of FIG. 1.

A set of marine data, as shown in FIG. 2, and representing land areas adjacent the course of the vessel, is programmed and stored in the computer auxiliary memory 3 beforehand. The movement of the vessel carrying the radar and the corresponding marine data from the set are taken out automatically from the computer and displayed on the display unti 5. In FIG. 2, the region outside the segmented lines is the region in the vicinity of land areas, as programmed as follows:

$$x \leq x_0; a_1x + b_1 > y > a_3x + b_3$$
$$x > x_0; a_2x + b_2 > y > a_3x + b_3$$

(1)

The signals $(x_1, y_1), (x_2, y_2), ..., (x_n, y_n)$, which have been supplied from radar 1 to computer 3 through data processing unit 2 are compared with the stored programmed condition (1) given above. As a result of this operation, any signals from radar 1 received by computer 3 through data processing unit 2 and failing to satisfy the condition (inequality) of programmed condition (1) eliminated as a scanned land area signal. All other signals are supplied to a collision avoidance program, so that the processing by this collision avoidance program becomes more reliable. After processing by these programs, the data are displayed on display unit 5.

In other words, when the vessel carrying the anti-collision system is at a greater distance from land areas along its course than limits defined by the stored positional data in memory 4, all land area positional data scanned by radar 1 and processed through unit 2 before being sent to computer 3 are eliminated from the signal supplied by computer 3 to a collision avoidance program.

The coordinate system is a "north-up" system having its origin O at the position of the respective vessel on the chart. Consequently, the set of marine data illustrated in FIG. 2 changes along with movement of the vessel.

As previously mentioned, the origin O of the coordinates $x$ and $y$ is at the position of the vessel, and this position constantly changes. Consequently the factors in the programmed condition (1), namely, $ai$, $bi$, where $i$ is equal to 1, 2, .... n, of the straight line or linear segments representing the land area naturally vary with movement of the vessel. The determination is effected in a manner which will not be described.

The marine area to be traversed by the vessel is previously divided along the course of the vessel into sections A, B, C ....., each of which corresponds to a unit of a chart of the marine area. On each unit of the chart, whose coordinates $x$, $y$ have their origin at the center of the unit of the chart or of the marine area, the straight lines or linear segments representing the land areas adjacent the course of the vessel in the particular unit of the chart are programmed and stored in the auxiliary memory 4. When, for example, the vessel is navigated in the unit marine area A, the coordinates of the center $A_o$ of such unit marine area A, which have their origin at the position of the vessel, vary with time. Assuming that the coordinates of such center $A_o$ are, at a certain instant, $x_A$, $y_A$, the linear segment representing the land area adjacent the course of the vessel, expressed in coordinates having their origin at the position of the vessel, is as follows:

$$(y - y_A) = a_{Ai} (x - x_A) + b_{Ai}$$

$$\therefore y = a_{Ai}x + (b_{Ai} + y_A - a_{Ai}x_A)$$

$$ai = a_{Ai}$$

$$bi = b_{Ai} + y_A - a_{Ai}x_A$$

It is necessary to recalculate the factors $ai$, $bi$ at intervals of about 5 seconds during the course of movements of the vessel. The factors $a_{Ai}$, $b_{Ai}$ are the data stored beforehand in the auxiliary memory 4 as the line or linear segment representing the land area adjacent the course of the vessel in the unit marine area A. Similar considerations apply when the vessel moves from the unit area A into the unit area B, etc.

In the immediately foregoing equations and the like, $y$ is the ship distance in the $y$ direction from $A_o$ which is the center of the unit marine area A, and $x$ is the ship distance in the $x$ direction from such center $A_o$ of the unit marine area.

While a specific embodiment of the invention has been shown and described in detail to illustrate the application of the principles of the invention, it will be understood that the invention may be embodied otherwise without departing from such principles.

What is claimed is:

1. A radar anti-collision system, for avoiding collisions between water-borne vessels in waters adjacent land areas, comprising, in combination, a radar mounted on a vessel and scanning objects in the course of the vessel; a data processing unit having an input connected to said radar and processing the positional data of land areas and of other vessels scanned by said radar; a computer connected to the output of said data processing unit; an auxiliary memory connected to an input of said computer and having stored therein a set of marine positional data with respect to land areas adjacent the course of the vessel, said auxiliary memory supplying the stored data to said computer in accordance with a present program for comparison, in said computer, with the positional data supplied by said data processing unit from said radar; and a general display unit connected to the output of said computer; said computer comparing the stored positional data with the processed positional data and, responsive to such comparison indicating that the vessel is at a greater distance from land areas than limits defined by the stored positional data, cancelling processed positional data relating to land areas from the positional data to a collision avoidance program in said computer so that the processing by said collision avoidance program becomes more reliable and the data displayed on said general display unit, responsive to such comparison indicating that the vessel is at a greater distance from land areas than limits defined by the stored positional data, does not include any positional data relating to land areas.

2. A radar anti-collision system, as claimed in claim 1, in which the stored positional data with respect to land areas adjacent the course of the vessel are represented by linear segments extending generally parallel to coastlines rather than by accurately contoured coastlines.

3. A radar anti-collision system, as claimed in claim 2, in which the positional data is represented with respect to a pair of rectangular coordinates X and Y whose origin O is on the vessel carrying the anti-collision system; the coordinates X representing the position of the vessel along its course and the coordinates Y representing the distance of the course from such linear segments.

4. A method of avoiding collisions between water-borne vessels in waters adjacent land areas utilizing a radar mounted on a vessel travelling a course in such waters, said method comprising operating the radar to scan the course of the vessel and provide positional data with respect to land areas and other vessels in the neighborhood of the vessel carrying the radar; processing the positional data at the output of the radar; supplying the processed positional data to a computer; storing positional data related to land areas adjacent the course of the vessel; supplying such stored data to the computer in accordance with a preset program; utilizing the computer to compare the stored positional data with the processed positional data; utilizing such comparison to delete, from the processed positional data, positional data with respect to land areas when the vessel is at a distance from such land areas at least equal to a predetermined minimum distance; and supplying the remaining positional data to a collision avoidance program.

* * * * *